US009247398B2

United States Patent
Narayanaswamy et al.

(10) Patent No.: US 9,247,398 B2
(45) Date of Patent: Jan. 26, 2016

(54) METHODS FOR BARGING USERS ON A REAL-TIME COMMUNICATIONS NETWORK

(75) Inventors: Gokulmuthu Narayanaswamy, Bangalore (IN); Mohanram Periasamy Narayanan, Bangalore (IN); Jan Forslow, San Mateo, CA (US)

(73) Assignee: Sonim Technologies, Inc., San Mateo, CA (US)

( * ) Notice: Subject to any disclaimer, the term of this patent is extended or adjusted under 35 U.S.C. 154(b) by 1166 days.

(21) Appl. No.: 11/934,216

(22) Filed: Nov. 2, 2007

(65) Prior Publication Data
US 2009/0117887 A1 May 7, 2009

(51) Int. Cl.
*H04M 3/42* (2006.01)
*H04W 4/10* (2009.01)
*H04W 76/00* (2009.01)

(52) U.S. Cl.
CPC .............. *H04W 4/10* (2013.01); *H04W 76/005* (2013.01)

(58) Field of Classification Search
CPC .............................. H04W 4/10; H04W 76/005
USPC ...................... 455/416, 518, 527; 379/208.01; 370/260
See application file for complete search history.

(56) References Cited

U.S. PATENT DOCUMENTS

| 7,606,593 | B1* | 10/2009 | Vu .................................. 455/527 |
| 8,738,058 | B2* | 5/2014 | Brewer .................... H04W 4/10 455/422.1 |
| 9,031,598 | B2* | 5/2015 | Pai ....................... H04W 76/005 455/416 |
| 2004/0165709 | A1* | 8/2004 | Pence et al. .............. 379/201.01 |
| 2005/0015443 | A1* | 1/2005 | Levine et al. ................. 709/204 |
| 2005/0170819 | A1* | 8/2005 | Barclay et al. ................ 455/416 |
| 2007/0036093 | A1* | 2/2007 | Newberg et al. .............. 370/260 |
| 2008/0140790 | A1* | 6/2008 | Gusler et al. .................. 709/206 |
| 2010/0267411 | A1* | 10/2010 | Allen ............................ 455/518 |

* cited by examiner

*Primary Examiner* — Barry Taylor
(74) *Attorney, Agent, or Firm* — Rahman LLC

(57) ABSTRACT

Methods for barging an online user on a real-time communications network are presenting including: making a barge request by a barging user to barge online users; if online users are a part of an on-going call and the barging user has a barge privilege, joining the barging user with the on-going call; and if online users are not part of the on-going call and the barging user has the barge privilege, creating a new call with the barging user and the online user. In some embodiments, methods further include: if the barging caller is restricted and the barging user does not have the barge privilege, denying the barging user from the joining; and if the barging caller is not restricted and the barging user does not have the barge privilege, joining the barging user with the on-going call, and granting the floor control based on a standard floor control rule.

30 Claims, 5 Drawing Sheets

METHODS FOR BARGING USERS ON A REAL-TIME COMMUNICATIONS NETWORK

BACKGROUND

As mobile communication devices have become a more intricate part of users' daily lives, the demand for expanded services for those devices continues to rise. Technological innovations have provided the means for many new and interesting uses for mobile communication devices to the point where mobile communication devices may be utilized efficiently for a variety of tasks including sending email, calendaring, and other functions. In some examples, specific applications of technology continue to provide expanded services. One such example is in push-to-talk (PTT) communications.

Push-to-talk over cellular (PoC) technologies were initially adopted by cell phone carriers as a way to instantaneously send transmissions between users on the system by emulating walkie-talkie communications over a mobile phone network. This system represented an application with specific technical limitations because communications characterized by a walkie-talkie type communications are half-duplex. That is, only one user may speak (or transmit) at a time during transmissions while all other users in a call may only listen.

However, there may be examples where interrupting a call may be desirable. In conventional systems, calls may generally not be interrupted. Rather, if an interrupting user desires to interrupt a call while a transmitting user is speaking, the interrupting user may be limited to submitting a request to the network. After a transmitting user releases the floor, that request may be processed and floor control may be granted to the interrupting user. Floor control dictates which user is allowed to transmit during a call. Floor control generally follows pre-determined rules. Thus, conventional systems may not allow an interrupting user to efficiently interrupt a call, even where an interruption may be highly desirable.

Likewise, in some examples, it may be desirable to monitor a call without notifying the "listened to" users that they are being monitored. This may be helpful in a variety of situations such as monitoring a sales agent for quality assurance. In both examples, conventional systems may not provide for effective interruption or monitoring of PoC calls. As such, methods for barging users on a real-time communications network are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for barging an online user on a real-time communications network are presenting including: making a barge request by a barging user to barge the online user; if the online user is part of an on-going call and the barging user has a barge privilege, joining the barging user with the on-going call; and if the online user is not part of the on-going call and the barging user has the barge privilege, creating a new call with the barging user and the online user. In some embodiments, methods further include: granting the barging user a floor control based on a barge floor control rule. In some embodiments, methods further include: if the barging caller is restricted and the barging user does not have the barge privilege, denying the barging user from the joining; and if the barging caller is not restricted and the barging user does not have the barge privilege, joining the barging user with the on-going call, and granting the floor control based on a standard floor control rule. In some embodiments, methods further include: if the online user is busy and the barging user does not have the barge privilege, denying the barging user from joining the on-going call. In some embodiments, methods further include: notifying the online user that the barge request was made before the online user logged on and notifying the barging user of a status of the online user before the making the barge request. In some embodiments, the real-time communications network is a push-to-talk over cellular (PoC) network, and the barging user and the online user are PoC client users. In some embodiments, the barge privilege includes: barge geographic limits, barge user limits, barge use limits, and barge time limits. In some embodiments, the barge privilege is configured to be optionally suspendable by the barging user.

In other embodiments, methods for barging a number of online users on a real-time communications network are presented, where the group includes a number of online users, are presented including: making a barge request by a barging user to barge the number of online users; if any of the number of online users are part of any of a number of on-going calls and the barging user has a barge privilege, pulling the number of online users from the number of on-going calls, and joining the number of online users pulled from the number of on-going calls with a barge call; and if any of the number of online users are not part of any of the number of on-going calls and the barging user has the barge privilege, joining the number of online users with the barge call. In some embodiments, methods further include: granting the barging user a floor control based on a barge floor control rule. In some embodiments, methods further include: if the barging caller is restricted and the barging user does not have the barge privilege, denying the barging user from the joining the number of online users with the barge call; and if the barging caller is not restricted and the barging user does not have the barge privilege, joining the barging user with an on-going call, and granting the floor control based on a standard floor control rule.

In other embodiments, methods for barging a barge group on a real-time communications network, where the barge group includes a number of online users, are presented including: making a barge request by a barging user to barge the barge group; if any of the number of online users of the barge group are part of any of a number of on-going calls and the barging user has a barge group privilege, pulling the number of online users from the number of on-going calls, and joining the number of online users pulled from the number of on-going calls with a barge group call; and if any of the number of online users are not part of any of the number of on-going calls and the barging user has the barge group privilege, joining the number of online users with the barge group call. In some embodiments, methods further include: granting the barging user a floor control based on a barge floor control rule. In some embodiments, methods further include: if the barging caller is restricted and the barging user does not have the barge group privilege, denying the barging user from the joining the number of online users with a group call; and if the barging caller is not restricted and the barging user does not have the barge group privilege, joining the barging user with the group call, and granting the floor control based on a standard floor control rule.

In other embodiments, methods for stealth barging an online user on a real-time communications network, are presented including: making a stealth barge request by a stealth barging user to stealth barge the online user; if the online user is part of an on-going call and the stealth barging user has a stealth barge privilege, joining the stealth barging user with the on-going call without alerting the online user; and monitoring the on-going call by the stealth barging user without alerting the online user. In some embodiments, methods further include: if the online user is not part of the on-going call and the stealth barging user has a stealth barge privilege, denying the stealth barging user; and if the stealth barging user does not have the stealth barge privilege, denying the stealth barging user. In some embodiments, methods further include: leaving the on-going call by the stealth barging user without alerting the online user. In some embodiments, methods further include: notifying the stealth barging user of a status of the online user before the making the stealth barge request.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
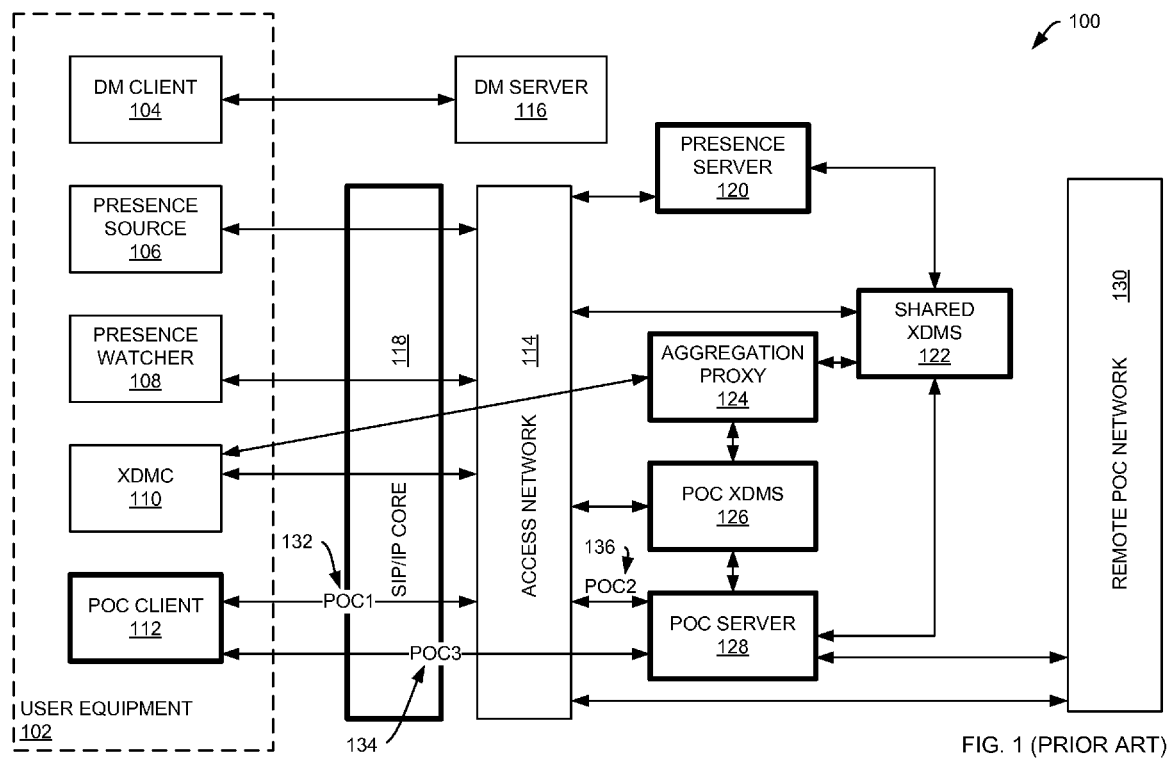
FIG. 1 is an illustrative representation of a prior art PoC System Architecture in accordance with OMA version 1 specifications.

| GLOSSARY | |
|---|---|
| Communications Network | One or more servers implementing a simplex media and session processing service, as could be exemplified by a plurality of packet switching and packet processing servers implementing a PoC service as defined by the Open Mobile Alliance (OMA). |
| IMS—IP Multimedia Subsystem | IMS is an all-IP wireless system (SIP/IP Core), where data, voice and signaling are all carried as IP packets. |
| GPRS—Generic Packet Radio Service | Packet switched service on GSM networks that provides an Internet Protocol bearer for applications such as PoC. |
| GSM—Global System for Mobile communication | The second generation digital technology originally developed for Europe but which now has in excess of 71% of the world market. Initially developed for operation in the 900 MHz band and subsequently modified for the 850, 1800 and 1900 MHz bands. |
| OMA—Open Mobile Alliance ™ | OMA is a neutral, global group that defines and promotes open standards for new mobile-phone-related technologies, focusing specifically on mobile data services, which is herein incorporated by reference in its' entirety. |
| PoC—Push-to-Talk over Cellular | PoC is a service that provides a "walkie-talkie" service utilizing VoIP technology to a number of terminals |
| PTT—Push-to-Talk | Similar to conventional walkie-talkie communication - users send a voice message to one or more recipients from a mobile phone by pushing a key. |
| Shared XDMS—Shared XML Document Management Server | An XCAP server that manages XML documents (e.g. Contact Lists) that are needed for the PoC service and which may be shared with other service enablers (e.g. Presence). |
| SIP—Session Initiation Protocol | A signaling protocol for Internet conferencing, telephony, presence, events notification, and instant messaging. The current IETF RFC is 3261. http://www.ietf.org/rfc/rfc3261.txt?number=3261 |
| UE—User Equipment | A terminal (e.g. handset or PC) with the PoC Client-Application installed. |
| VoIP—Voice over Internet Protocol | VoIP is an exemplary of a combination of a session signaling protocol and a media transfer protocol. VoIP is a technology that is used to transmit media in the form of digital data packets, over Internet Protocols, as opposed to using traditional telephone lines or circuit switched wireless bearers. For the purposes of this present invention packet protocols and circuit switched protocols and methods are indistinguishable. VoIP—Voice over Internet Protocol |
| XCAP—XML Configuration Access Protocol | XCAP allows a client to read, write, and modify application configuration data, stored in XML format on a server. XCAP maps XML document sub-trees and element attributes to HTTP URIs, so that these components can be directly accessed by HTTP. |
| XDMC—XML Document Management Client | An XCAP client that manages XML documents stored in the network (e.g. PoC-specific documents in the PoC XDMS, Contact Lists in the Shared XDMS, etc). |
| XDMS—XML Document Management Server | An XCAP server that manages XML documents (e.g. Contact Lists) that are utilized by various applications. Each application has its own designated XDMS (e.g. PoC XDMS) and can utilize the Shared XDMS. |

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The invention is described with reference to specific architectures and protocols. Those skilled in the art will recognize that the description is for illustration and to provide the best mode of practicing the invention. The description is not meant to be limiting. For example, reference is made to an OMA PoC system, while other types of PTT systems using any mobile or fixed access network can also benefit form the present invention. Likewise, reference is made to PTT sessions, while the present invention can be applied to other types of VOIP conference calls where floor control policies are applied.

FIG. 1 is an illustrative representation of a prior art PoC System architecture 100 in accordance with OMA version 1 specifications. An OMA PoC system architecture 100 includes User Equipment (UE) 102 and a set of network components. As illustrated, UE 102 contains components to interface the user acting as participant in a push-to-talk over cellular (PoC) session under the OMA version 1 specifications. UE 102 can either be a mobile terminal, a PC or any other device connected to the access network. Device Management (DM) client 104 inside UE 102 is used to bootstrap UE 102 with necessary configuration data from a DM server 116. An XML Document Management Client (XDMC) 110 is used to download and update by request any relevant contact lists stored in Shared XML Document Management Server (XDMS) 122. An Aggregation Proxy 124 may be configured to perform the authentication of any such requests. Similarly, the XDMC 110 is also configured to communicate via Aggregation Proxy 124 with PoC-specific XDMS (PoC XDMS) 126 for the purpose of managing group policies and authorization lists. UE 102 further includes Presence Source 106 and Presence Watcher 108. Presence Source 106 may be configured to publish a UE's availability status to other users. Presence Watcher 108 may be configured to retrieve availability status of others (e.g. other UEs and contacts). Both UE presence entities communicate with Presence Server 120 via a SIP/IP Core 118. In an OMA PoC system built on top of a GPRS radio network, a SIP/IP Core is often an IP Multimedia Subsystem (IMS) as standardized by the 3rd Generation Partnership Project (3GPP).

A PoC client's main responsibilities are: session management, SIP registration, TBCP request-response management, media transmission, and media reception. Under existing standards, session management, SIP registration may be accomplished over POC-1 and POC-2 interfaces 132 and 136 respectively. Furthermore, TBCP request-response management, media transmission, and media may be accomplished over POC-3 interface 134. PoC server 128 is responsible for application level network functionality including PoC session establishment, termination, handling of TBCP messages and media switching between the participating clients.

In general, a POC-3 interface, in accordance with OMA standards, applies Talk Burst Control Protocol (TBCP) as a floor control protocol and sends media using the Real-Time Transfer Protocol (RTP). Floor control refers to permission for a UE to speak or otherwise send media. TBCP state machines are instantiated in both PoC clients and PoC servers after a successful SIP session establishment has occurred on POC-1 and POC-2 interfaces. In an OMA PoC system, when a PoC client sends a TBCP_Request message to a PoC server to ask for the permission to talk, the PoC server determines an appropriate response. That is, whether or not to grant permission based on floor availability. This response may be communicated back to the PoC client using appropriate messages (e.g. TBCP_Grant or TBCP_Deny). When a PoC server sends a TBCP_Grant message, permission to speak is granted to the requesting PoC client whereupon the requesting PoC client's media may be forwarded to other session participants. When a PoC server sends a TBCP_Deny message, permission to speak is denied to the requesting PoC client whereupon the requesting PoC client's media may be dropped by the PoC server.

Figure 2:
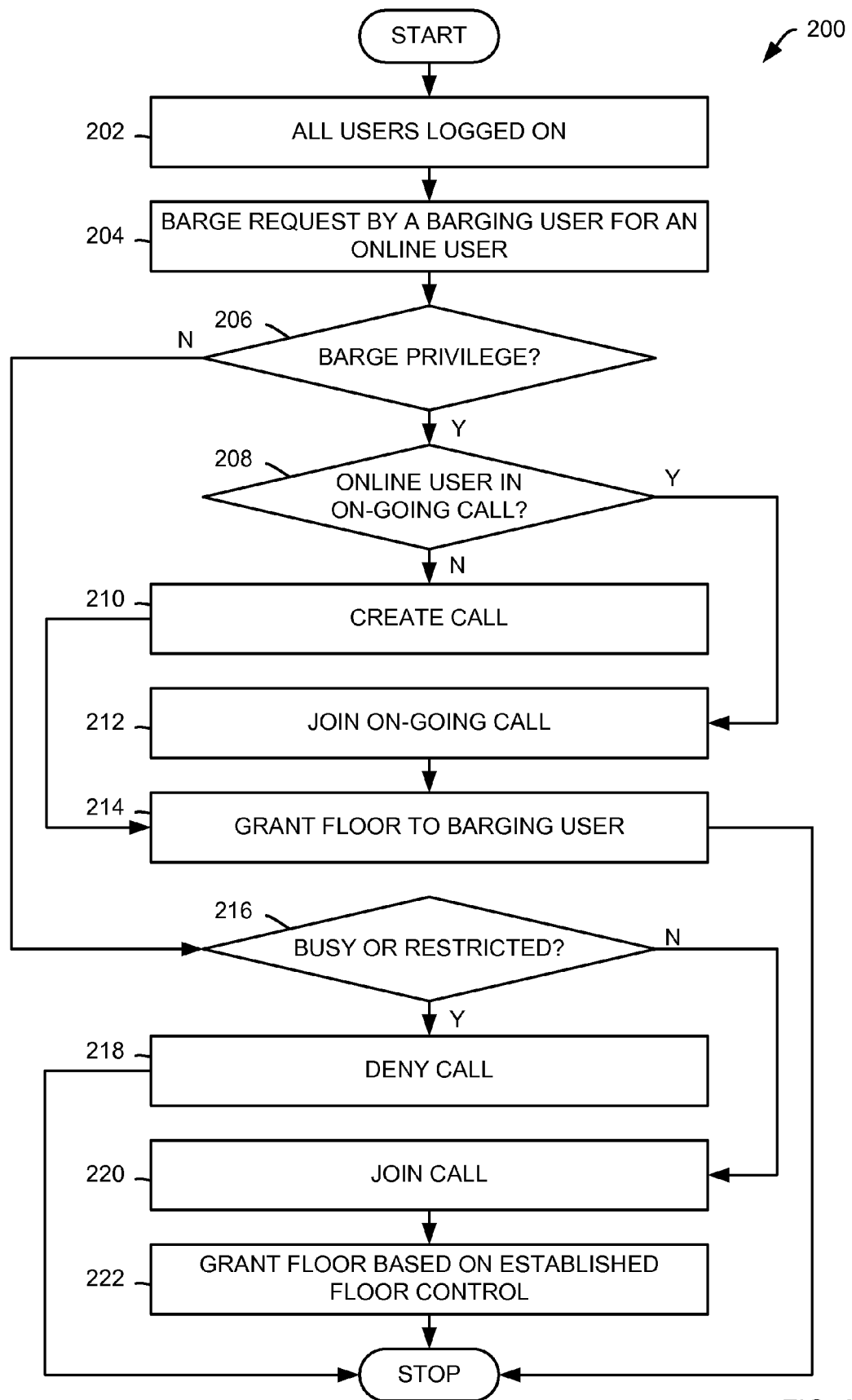
FIG. 2 is an illustrative flowchart of methods for barging a single online user in accordance with embodiments of the present invention.

FIG. 2 is an illustrative flowchart 200 of methods for barging a single online user in accordance with embodiments of the present invention. As noted above, it may be desirable to interrupt an on-going call for any number of reasons. As such, at a first step 202, all users are logged onto a real-time communications system. In some embodiments, a real-time communications system is a PoC network. It may be appreciated that if a user is not online, the user cannot be interrupted. At a next step 204, a barge request is made by a barging user for an online user. In some embodiments, a barging user and an online user are PoC client users. In general, a barge request, to be permitted, must be made by a barging user having appropriate barge privileges. Because barging, in embodiments, supersedes normal transmission restrictions, barging limits may be implemented to prevent unauthorized or indiscriminate barging. Thus, barging limits may, in some embodiments, be granted solely by an administrative level user. Barging limits, as contemplated by embodiments, may be utilized to prevent overuse or misuse of this functionality. For example, in some embodiments, barging limits may include: barge geographic limits that limit barging to a specified geographic area, barge user limits that limit barging to a number or a group of selected users, barge use limits that limit barging to a maximum number of barge uses for a barging user or of an online user, and barge time limits that limit a barging user to a limited period of floor control during a barge.

At a next step 206, the method determines whether a barge privilege exists for a barging user. If the method determines at a step 206 that a barge privilege exists, the method continues to a step 208 to determine whether the online user is in an on-going call. In some embodiments, a barging user may be configured to receive notifications of the status of an online user before making a barge request. That is, whether an online user is online or in a call. These notifications, in some embodiments, may be manually or automatically retrieved. If the method determines at a step 208 that the online user is in an on-going call, the method joins the barging user with the online user's on-going call at a step 212. If the method determines at a step 208 that the online user is not in an on-going call, the method creates a call with the online user at a step 210. It may be appreciated that although a barge is generally limited to online users, a barge request may, in some embodiments, result in a message that may be delivered to an offline user after the offline user logs on to the system to indicate a barge request was made for that user. In other embodiments, no notification is made. Once a call is created or joined, the method continues to a step 214 to grant floor control to a barging user, whereupon the method ends. It may be appreciated that this type of interaction is highly intrusive. As such, as noted above, a number of limits may be employed to prevent overuse or misuse of this functionality. Thus, in embodiments, when a barge time limit is exceeded, the floor control granted to a barging user may be revoked.

Returning to a step 206, if the method determines that a barge privilege does not exist for a barging user, the method may be configured to handle a barge request like a simple call request or call invitation. As such, the method continues to a step 216 to determine whether the online user is busy or whether the barging user is restricted. An online user may be busy when the online user is already in a communication session. A barging user may be restricted by an online user to prevent that barging user from contacting the online user. Restrictions may be individually configurable for each user in some embodiments. If the method determines at a step 216 that the online user is busy or the barging user is restricted, the method continues to a step 218 to deny the call, whereupon the method ends. If the method determines at a step 216 that the online user is not busy or the barging user is not restricted, the method joins the barging user to the call at a step 220. In some embodiments, joining a call without barge privileges may include joining an on-going call when an online user is in an on-going call. In some embodiments, joining a call without barge privileges may include creating a new call when an online user is not in an on-going call. At a next step 222, the method grants floor control based on established floor control procedures in contrast to a step 214, which grants floor control immediately to a barging user. The method then ends.

Figure 3:
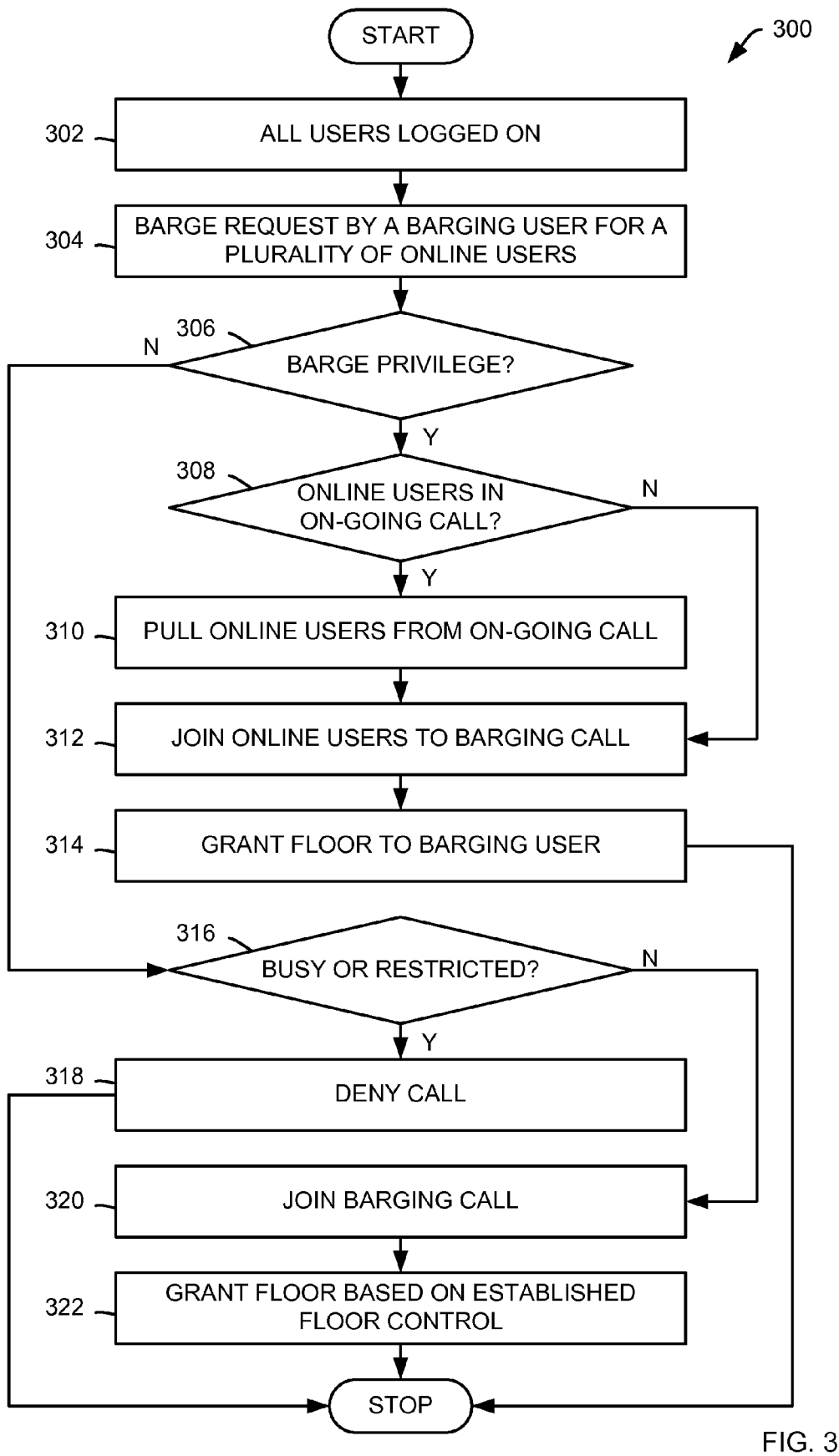
FIG. 3 is an illustrative flowchart of methods for barging a plurality of online users in accordance with embodiments of the present invention.

FIG. 3 is an illustrative flowchart 300 of methods for barging a plurality of online users in accordance with embodiments of the present invention. In some embodiments, it may be desirable to barge any number of online users. As such, at a first step 302, all users are logged onto a real-time communications system. In some embodiments, a real-time communications system is a PoC network. It may be appreciated that if a user is not online, the user cannot be interrupted. At a next step 304, a barge request is made by a barging user for any number of online users. In some embodiments, a barging user and online users are PoC client users. As noted above, a barge request, to be permitted, must be made by a barging user having appropriate barge privileges. Because barging, in embodiments, supersedes normal transmission restrictions, barging limits may be implemented to prevent unauthorized or indiscriminate barging. Thus, barging limits may, in some embodiments, be granted solely by an administrative level user. Barging limits, as contemplated by embodiments, may be utilized to prevent overuse or misuse of this functionality. For example, in some embodiments, barging limits may include: barge geographic limits that limit barging to a specified geographic area, barge user limits that limit barging to a number or a group of selected users, barge use limits that limit barging to a maximum number of barge uses for a barging user or of an online user, and barge time limits that limit a barging user to a limited period of floor control during a barge.

At a next step 306, the method determines whether a barge privilege exists for a barging user. If the method determines at a step 306 that a barge privilege exists, the method continues to a step 308 to determine whether any of the online users are in an on-going call. In some embodiments, a barging user may be configured to receive notifications of the status of an online user before making a barge request. That is, whether an online user is online or in a call. These notifications, in some embodiments, may be manually or automatically retrieved. If the method determines at a step 308 that any of the online users are in an on-going call, the method pulls any of the online users that are in an on-going call from their calls at a step 310. Forcibly pulling a user from a call may be disruptive and intrusive. Once again, a number of limits may be employed to prevent overuse or misuse of this functionality. The method then joins pulled online users to a barging call at a step 312. As noted above, it may be appreciated that although a barge is generally limited to online users, a barge request may, in some embodiments, result in a message that may be delivered to an offline user after the offline user logs on to the system to indicate a barge request was made for that user. In other embodiments, no notification is made. Returning to a step 308, if the method determines at a step 308 that any of the online users are not in an on-going call, the method continues to a step 312 to join online users to a barging call. Once a call is joined, the method continues to a step 314 to grant floor control to a barging user, whereupon the method ends. It may be appreciated that this type of interaction is highly intrusive. As such, as noted above, a number of limits may be employed to prevent overuse or misuse of this functionality. Thus, in embodiments, when a barge time limit is exceeded, the floor control granted to a barging user may be revoked.

Returning to a step 306, if the method determines that a barge privilege does not exist for a barging user, the method may be configured to handle a barge request like a simple call request or call invitation. As such, the method continues to a step 316 to determine whether the online users are busy or whether the barging user is restricted. An online user may be busy when the online user is all ready in a communication session. A barging user may be restricted by an online user to prevent that barging user from contacting the online user. Restrictions may be individually configurable for each user in some embodiments. If the method determines at a step 316 that any of the online users are busy or the barging user is restricted, the method continues to a step 318 to deny the call, whereupon the method ends. If the method determines at a step 316 that any of the online users are not busy or the barging user is not restricted, the method joins the barging user to the call at a step 320. In some embodiments, joining a call without barge privileges may include joining an on-going call when an online user is in an on-going call. In some embodiments, joining a call without barge privileges may include creating a new call when an online user is not in an on-going call. At a next step 322, the method grants floor control based on established floor control procedures in contrast to a step 314, which grants floor control immediately to a barging user. The method then ends.

Figure 4:
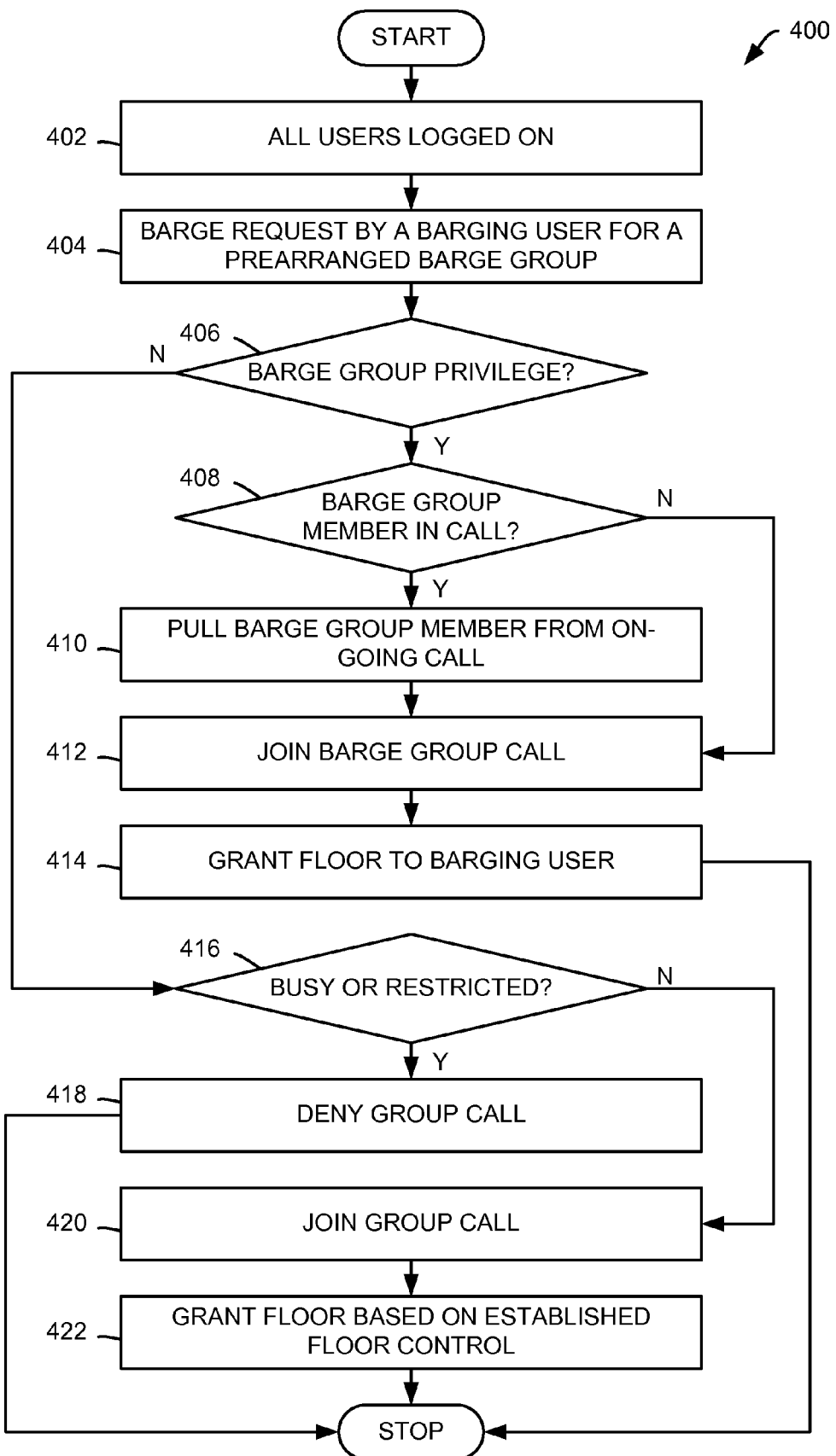
FIG. 4 is an illustrative flowchart of methods for barging a group of online users in accordance with embodiments of the present invention.

FIG. 4 is an illustrative flowchart 400 of methods for barging a group of online users in accordance with embodiments of the present invention. In some embodiments, it may be useful to enable barging to a specific group (i.e. a barge group)

of online users. Creating a barge group for a barge call has the advantage of not requiring a barging user to have barge privileges. Rather, a barging user can be configured solely with privileges directed to the barge group to enable barging. In this manner, for example, emergency barging to a barge group may be affected by any member of the barge group with group privileges. Barge groups, like conventional groups, consisting of one or more users (i.e. group members) may be created in any manner well-known in the art without departing from the present invention. As such, at a first step 402, all users are logged onto a real-time communications system. In some embodiments, a real-time communications system is a PoC network. It may be appreciated that if a user is not online, the user cannot be interrupted. At a next step 404, a barge request is made by a barging user for a prearranged barge group. In some embodiments, a barging user and online users are PoC client users. In embodiments, a barge request, to be permitted, must be made by a barging user having appropriate barge group privileges. That is, the user must have group privileges. Thus, in some embodiments, barge privileges may not be required. Because barging, in embodiments, supersedes normal transmission restrictions, barging limits may be implemented to prevent unauthorized or indiscriminate barging. Barging limits, as contemplated by embodiments, may be utilized to prevent overuse or misuse of this functionality. For example, in some embodiments, barging limits may include: group barge limits that limit barging to a group of selected users, barge use limits that limit barging to a maximum number of barge uses for a barging user or of an online user, and barge time limits that limit a barging user to a limited period of floor control during a barge.

At a next step 406, the method determines whether a barge group privilege exists for a barging user. If the method determines at a step 406 that a barge group privilege exists, the method continues to a step 408 to determine whether any of the barge group members are in an on-going call. In some embodiments, a barging user may be configured to receive notifications of the status of a barge group member before making a barge request. That is, whether barge group member is online or in a call. These notifications, in some embodiments, may be manually or automatically retrieved. If the method determines at a step 408 that any of the barge group members are in an on-going call, the method pulls any of the barge group members that are in an on-going call from their calls at a step 410. Forcibly pulling a barge group member from a call may be disruptive and intrusive. Once again, a number of limits may be employed to prevent overuse or misuse of this functionality. The method then joins pulled barge group members to a barging call at a step 412. As noted above, it may be appreciated that although a barge is generally limited to online users, a barge request may, in some embodiments, result in a message that may be delivered to an offline user after the offline user logs on to the system to indicate a barge request was made for that user. In other embodiments, no notification is made. Returning to a step 408, if the method determines at a step 408 that any of the barge group members are not in an on-going call, the method continues to a step 412 to join barge group members to a group barge call. Once a group barge call is joined, the method continues to a step 414 to grant floor control to a barging user, whereupon the method ends. It may be appreciated that this type of interaction is highly intrusive. As such, as noted above, a number of limits may be employed to prevent overuse or misuse of this functionality. Thus, in embodiments, when a barge time limit is exceeded, the floor control granted to a barging user may be revoked.

Returning to a step 406, if the method determines that a group barge privilege does not exist for a barging user, the method may be configured to handle a barge request like a simple call request or call invitation. As such, the method continues to a step 416 to determine whether the group members are busy or whether the barging user is restricted. A group member may be busy when the group member is all ready in a communication session. A barging user may be restricted by a group member to prevent that barging user from interrupting or otherwise contacting the group member. Restrictions may be individually configurable for each user in some embodiments. If the method determines at a step 416 that any of the group members are busy or the barging user is restricted, the method continues to a step 418 to deny the call, whereupon the method ends. If the method determines at a step 416 that any of the group members are not busy or the barging user is not restricted, the method joins the barging user to the call at a step 420. In some embodiments, joining a call without barge privileges may include joining a user's on-going call when an online user is in an on-going call. In some embodiments, joining a call without barge privileges may include creating a new call when an online user is not in an on-going call. At a next step 422, the method grants floor control based on established floor control procedures in contrast to a step 414, which grants floor control immediately to a barging user. The method then ends.

Figure 5:
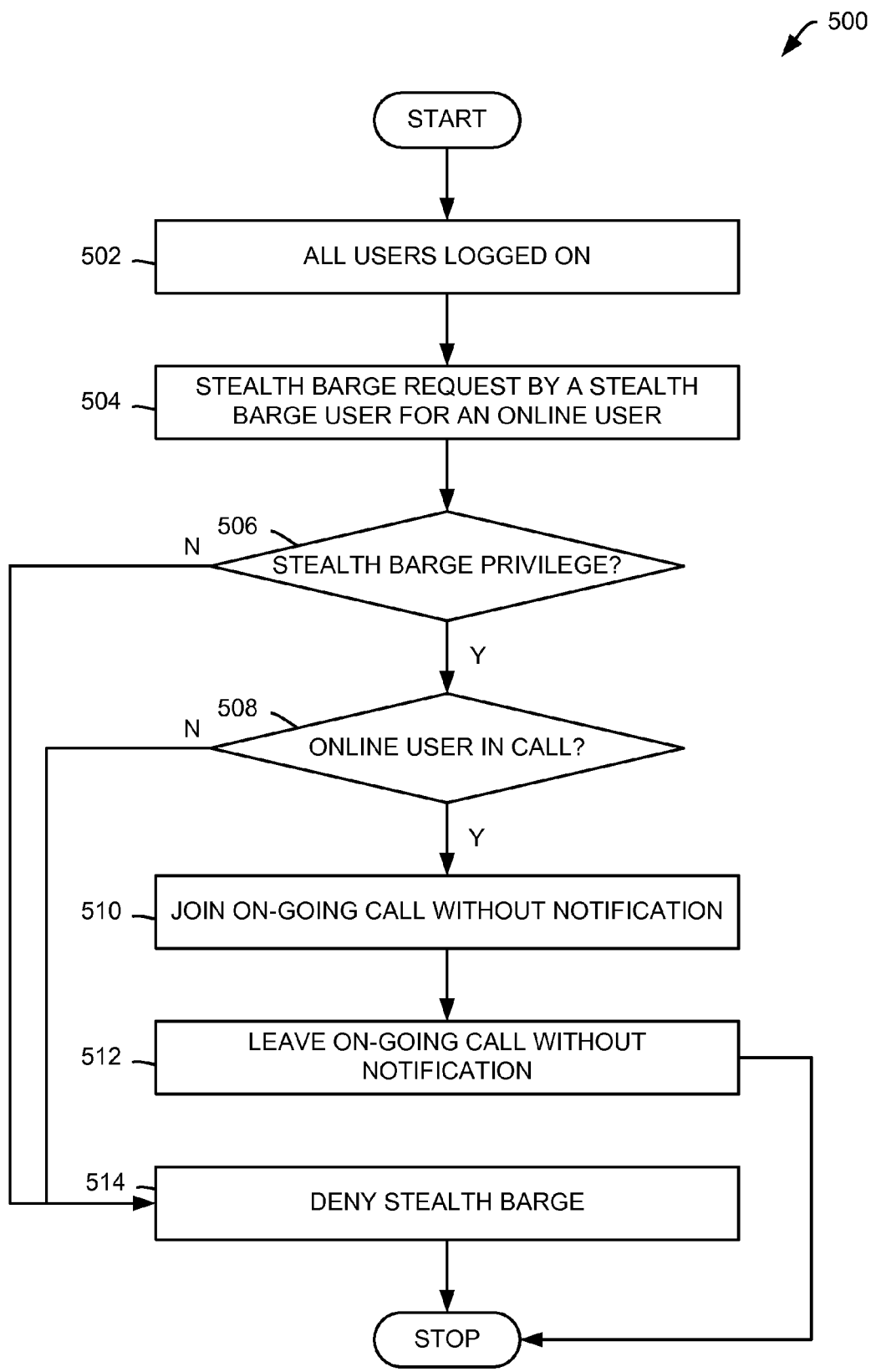
FIG. 5 is an illustrative flowchart of methods for stealth barging a single online user in accordance with embodiments of the present invention.

FIG. 5 is an illustrative flowchart 500 of methods for stealth barging a single online user in accordance with embodiments of the present invention. In some embodiments, it may be desirable to monitor an on-going call without notification. For example, as a quality control tool, monitoring may be used to evaluate a technician's performance when dealing with a customer. As such, at a first step 502, all users are logged onto a real-time communications system. In some embodiments, a real-time communications system is a PoC network. It may be appreciated that if a user is not online, the user cannot be interrupted. At a next step 504, a stealth barge request is made by a stealth barging user for an online user. In some embodiments, a stealth barging user and an online user are PoC client users. In general, a stealth barge request, to be permitted, must be made by a stealth barging user having appropriate stealth barge privileges. Because stealth barging, in embodiments, supersedes normal transmission restrictions, stealth barging limits may be implemented to prevent unauthorized or indiscriminate stealth barging. Thus, stealth barging limits may, in some embodiments, be granted solely by an administrative level user. Stealth barging limits, as contemplated by embodiments, may be utilized to prevent overuse or misuse of this functionality. For example, in some embodiments, stealth barging limits may include: stealth barge geographic limits that limit stealth barging to a specified geographic area, stealth barge user limits that limit stealth barging to a number or a group of selected users, stealth barge use limits that limit stealth barging to a maximum number of stealth barge uses for a stealth barging user or of an online user, and stealth barge time limits that limit the duration of a stealth barge.

At a next step 506, the method determines whether a stealth barge privilege exists for a stealth barging user. If the method determines at a step 506 that a stealth barge privilege exists, the method continues to a step 508 to determine whether the online user is in an on-going call. In some embodiments, a stealth barging user may be configured to receive notifications of the status of an online user before making a stealth barge request. That is, whether an online user is online or in a call. These notifications, in some embodiments, may be manually or automatically retrieved. If the method determines at a step 508 that the online user is in an on-going call, the method joins the stealth barging user with the online user's on-going call without notification at a step 510. If the method determines at a step 508 that the online user is not in an on-going call, the method denies the stealth barge request at a step 514, whereupon the method ends. It may be appreciated that a stealth barge is necessarily limited to online users. Once a call is joined, a stealth barge user may continue to monitor the call for a desired time period. In some embodiments, a stealth barge time limit may be utilized to limit the duration of a stealth barge. In this manner, monitoring may be accomplished where privacy issues may required limited duration and scope of monitoring. Returning to a step 506, if the method determines that a stealth barge privilege does not exist for a stealth barging user, the method denies the stealth barge request at a step 514, whereupon the method ends.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for barging an online user on a real-time communications network, the method comprising:
   making a barge request by a barging user to barge the online user;
   if the online user is part of an on-going call and the barging user has a barge privilege,
      joining the barging user with the on-going call;
   if the online user is not part of the on-going call and the barging user has the barge privilege,
      creating a new call with the barging user and the online user; and
wherein the barge privilege includes barge limits selected from the group consisting of: barge geographic limits, barge user limits, barge use limits, and barge time limits.

2. The method of claim 1, further comprising:
   granting the barging user a floor control based on a barge floor control rule.

3. The method of claim 1, further comprising:
   if the barging caller is restricted and the barging user does not have the barge privilege,
      denying the barging user from the joining; and
   if the barging caller is not restricted and the barging user does not have the barge privilege,
      joining the barging user with the on-going call, and
      granting the floor control based on a standard floor control rule.

4. The method of claim 1, further comprising:
   if the online user is busy and the barging user does not have the barge privilege,
      denying the barging user from joining the on-going call.

5. The method of claim 1, further comprising; notifying the online user that the barge request was made before the online user logged on.

6. The method of claim 1, further comprising; notifying the barging user of a status of the online user before the making the barge request.

7. The method of claim 1, wherein
   the real-time communications network is a push-to-talk over cellular (PoC) network, and wherein
   the barging user and the online user are PoC client users.

8. The method of claim 1, wherein the barge privilege is configured to be optionally suspendable by the barging user.

9. A method for barging a plurality of online users on a real-time communications network, wherein the group includes a plurality of online users, the method comprising:
   making a barge request by a barging user to barge the plurality of online users;
   if any of the plurality of online users are part of any of a plurality of on-going calls and the barging user has a barge privilege,
      pulling the plurality of online users from the plurality of on-going calls, and
      joining the plurality of online users pulled from the plurality of on-going calls with a barge call;
   if any of the plurality of online users are not part of any of the plurality of on-going calls and the barging user has the barge privilege,
      joining the plurality of online users with the barge call; and
wherein the barge privilege includes barge limits selected from the group consisting of: barge geographic limits, barge user limits, barge use limits, and barge time limits.

10. The method of claim 9, further comprising:
    granting the barging user a floor control based on a barge floor control rule.

11. The method of claim 9, further comprising:
    if the barging caller is restricted and the barging user does not have the barge privilege,
       denying the barging user from the joining the plurality of online users with the barge call; and
    if the barging caller is not restricted and the barging user does not have the barge privilege,
       joining the barging user with an on-going call, and
       granting the floor control based on a standard floor control rule.

12. The method of claim 9, further comprising:
    if the plurality of online users is busy and the barging user does not have the barge privilege,
       denying the barging user from the joining the plurality of online users with the on-going call.

13. The method of claim 9, further comprising: notifying the plurality of online users that the barge request was made before the plurality of online users logged on.

14. The method of claim 9, further comprising: notifying the barging user of a status of the online user before the making the barge request.

15. The method of claim 9, wherein
    the real-time communications network is a push-to-talk over cellular (PoC) network, and wherein
    the barging user and the plurality of online users are PoC client users.

16. The method of claim 9, wherein the barge privilege is configured to be optionally suspendable by the barging user.

17. A method for barging a barge group on a real-time communications network, wherein the barge group includes a plurality of online users, the method comprising:
    making a barge request by a barging user to barge the barge group;
    if any of the plurality of online users of the barge group are part of any of a plurality of on-going calls and the barging user has a barge group privilege,
       pulling the plurality of online users from the plurality of on-going calls, and joining the plurality of online users pulled from the plurality of on-going calls with a barge group call;
if any of the plurality of online users are not part of any of the plurality of on-going calls and the barging user has the barge group privilege,
joining the plurality of online users with the barge group call; and
wherein the barge group privilege includes barge limits selected from the group consisting of: barge group limits, barge user limits, barge use limits, and barge time limits.

18. The method of claim 17, further comprising:
granting the barging user a floor control based on a barge floor control rule.

19. The method of claim 17, further comprising:
if the barging caller is restricted and the barging user does not have the barge group privilege,
denying the barging user from the joining the plurality of online users with a group call; and
if the barging caller is not restricted and the barging user does not have the barge group privilege,
joining the barging user with the group call, and
granting the floor control based on a standard floor control rule.

20. The method of claim 17, further comprising:
if the plurality of online users is busy and the barging user does not have the barge group privilege,
denying the barging user from the joining the plurality of online users with the barge group call.

21. The method of claim 17, further comprising: notifying the barge group that the barge request was made before the barge group logged on.

22. The method of claim 17, further comprising: notifying the barging user of a status of the plurality of online users before the making the barge request.

23. The method of claim 17, wherein
the real-time communications network is a push-to-talk over cellular (PoC) network, and wherein
the barging user and the plurality of online users are PoC client users.

24. The method of claim 17, wherein the barge group privilege is configured to be optionally suspendable by the barging user.

25. A method for stealth barging an online user on a real-time communications network, the method comprising:
making a stealth barge request by a stealth barging user to stealth barge the online user;
if the online user is part of an on-going call and the stealth barging user has a stealth barge privilege,
joining the stealth barging user with the on-going call without alerting the online user;
monitoring the on-going call by the stealth barging user without alerting the online user; and
wherein the stealth barge privilege includes stealth barge limits selected from the group consisting of: stealth barge geographic limits, stealth barge user limits, stealth barge use limits, and stealth barge time limits.

26. The method of claim 25, further comprising:
if the online user is not part of the on-going call and the stealth barging user has a stealth barge privilege,
denying the stealth barging user; and
if the stealth barging user does not have the stealth barge privilege,
denying the stealth barging user.

27. The method of claim 25, further comprising:
leaving the on-going call by the stealth barging user without alerting the online user.

28. The method of claim 25, further comprising: notifying the stealth barging user of a status of the online user before the making the stealth barge request.

29. The method of claim 25, wherein
the real-time communications network is a push-to-talk over cellular (PoC) network, and wherein
the stealth barging user and the online user are PoC client users.

30. The method of claim 25, wherein the stealth barge privilege is configured to be optionally suspendable by the barging user.

* * * * *